May 31, 1960 C. D. WEST 2,938,405

AUXILIARY KNOB FASTENER FOR CRANKS

Filed Jan. 17, 1958

INVENTOR
CHARLES D. WEST

BY A. Yates Dowell
ATTORNEY

United States Patent Office 2,938,405

Patented May 31, 1960

2,938,405

AUXILIARY KNOB FASTENER FOR CRANKS

Charles D. West, 2710 N. Orange Ave., Orlando, Fla.

Filed Jan. 17, 1958, Ser. No. 709,573

2 Claims. (Cl. 74—545)

This invention relates to utility devices used primarily as a substitute for other devices damaged or having parts lost and in need of repair or the replacement as well as other structures employed in numerous capacities for accomplishing various results and at least to some degree involving labor in the use of the same.

The invention is concerned particularly with fasteners and accessories of different kinds including in the automobile industry and especially to auxiliary fasteners and the like capable of being used in the solution of small annoying problems such as the reattachment of detached parts of the mechanism.

Considerable difficulty has been encountered by the failure, due to breakage, accidental separation, or the like, of some of the smaller parts of an automobile, creating the necessity for repair and making the operation of the automobile unsatisfactory, unpleasant or disagreeable. Among the difficulties encountered are the detachment of the knobs of automobile crank handles, which are exceedingly difficult to replace because of the very limited space between such crank handles and the adjacent inside of the door panel, which knob replacement requires removal of the entire handle on account of the fact that the knobs are fastened in place either by screws, bolts or nuts. The replacement of an operating knob of this kind, therefore, has presented a substantial problem.

It is an object of the invention to overcome the difficulties enumerated and to provide relatively simple and inexpensive repair mechanism by which the knob on a crank handle or other object can be quickly and easily replaced and without removing the entire handle.

Another object of the invention is to provide a pushon knob for a crank handle or other object and cooperating fastening mechanism by which such knob may be secured firmly in adjusted position regardless of the thickness of the crank handle.

Figure 1:
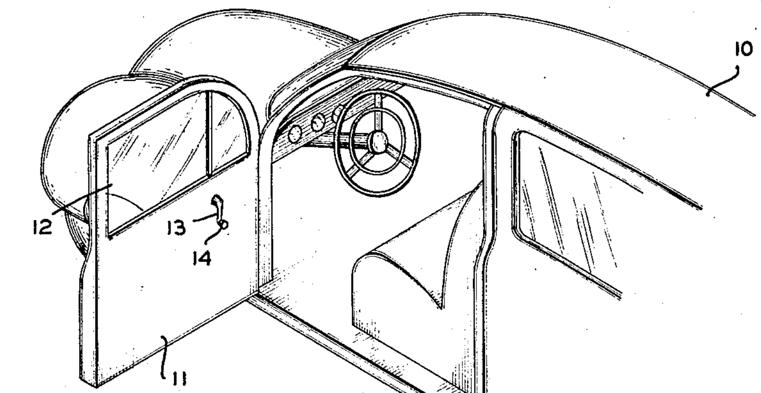
Figure 2:
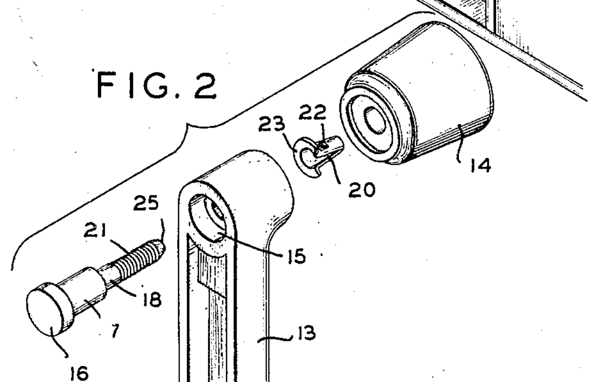
Figure 3:
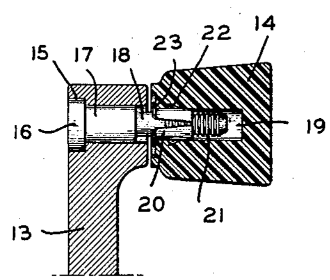
Figure 4:
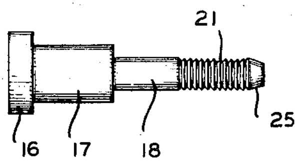

Other objects and advantages of the invention will be apparent from the following description taken in conjunction with the accompanying drawing wherein:

Fig. 1 is a perspective of a fragment of an automobile with the door open to expose the window manipulation crank handle and its operating knob;

Fig. 2, an exploded view of the crank handle and enlarged knob and illustrating the manner of replacing the knob without necessitating the removal of the crank handle;

Fig. 3, a transverse section through the assembled crank handle and knob;

Fig. 4, an enlarged side elevation of the mounting pin; and

Figures 5, 6:
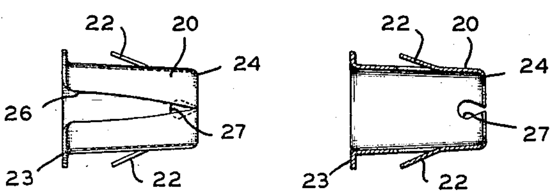

Figs. 5 and 6 respectively, enlarged side and sectional views of the generally tubular retaining clip.

Briefly stated the present invention for installing knobs including on window crank handles without removing the latter comprises a pin and a retaining clip or collet, in the form of a small slit sleeve or wedge member. The slit sleeve is forceably inserted in the opening in a knob to be replaced and is pushed onto a pin extending through the crank handle, the sleeve or wedging clip producing a tight fit between the pin, the wedge member, and the interior of the opening in the knob so that the knob is firmly fastened in place.

With continued reference to the drawing, the device of the present invention is designed for use wherever it is desired to fasten a knob to another member and for purposes of illustration there is shown an automobile 10 having a door 11 with a glass providing a window 12 adapted to be raised and lowered by means of suitable mechanism including a crank arm 13 and a gripping knob 14 by which the crank arm is adapted to be rotated.

The knob 14 normally is rotatably mounted on a conventional bolt or pin, not shown, carried within an opening 15 in the end of the crank arm 13 but due to wear the knob 14 becomes disconnected from the crank arm and operation of the crank arm cannot be easily accomplished but becomes very difficult.

Further, sunlight or heat causes the original plastic knobs, which are standard equipment in the majority of automotive vehicles, to expand to a sufficient degree that such knobs become loose from their respective shafts and will fall or pull off with relatively small pressure and, because of their original design, cannot be replaced satisfactorily.

In accordance with the present invention a special pin or bolt and cooperating sleeve are provided, designed universally to fit the majority of crank handles and operating knobs on all makes of automobiles and trucks. Such pin or bolt has a head 16 a cylindrical shank portion 17 and an additional reduced shank portion 18. This pin is adapted to be inserted into or be received through the opening 15 in the crank arm 13 or support and into the opening 19 in the operating knob 14.

In order to produce a tight fit between the parts the opening in the knob is lined with a slit sleeve wedge member or collet which forms a retaining clip or sleeve 20 so that the parts may be assembled by inserting the pin from the back or panel side through the opening 15 in the crank arm 13 after which a block or support of any desired relatively solid material is placed between the head 16 of the pin and the door panel so that pressure may be applied to the knob on the opposite side of the door handle for forcing the parts together in which assembled relation they will be held by the clip 20.

In other words when it is desired to secure a knob in position to a crank arm, a collet or retaining clip or sleeve 20 preferably formed of spring steel is forceably inserted in the opening in the knob ready to grip the protruding end of the pin forced thereinto. Desirably, the reduced shank portion 18 of the pin is provided with a series of grooves 21 to facilitate adjustable union between the pin and the sleeve or clip. Thus, simply by providing a pin and a wedging or collet forming sleeve, the knob can be replaced ready for use, and when so replaced may with such pin rotate freely in the crank handle.

In order to promote permanency of attachment of the knob and pin with the collet therebetween the sleeve of which the collet is formed is provided with stuck-out projections on tongues 22. In like manner the sleeve 20 has a flange 23 at its larger end to limit insertion of the sleeve into the knob 14 and the sleeve has its smaller end provided with a restricting ring 24 to snugly engage the shank 18 of the pin and enter the groove 21 of such shank.

The end of the shank 18 is provided with a bevel 25 for expanding the ring 24 to establish a tight joint between the collet and the pin. The collet forming sleeve 20 is a split cylinder having an opening 26 along one side to promote adaptability to the opening in the knob and the sleeve also has another opening 27 on its opposite side so that opposite portions of the sleeve may expand simultaneously.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. The combination of an operating knob having an opening therein, means for attaching the same to a crank arm having a transverse opening therethrough comprising a pin having a shank with a body of a size to fit rotatably in the opening in said crank arm, said pin having a head at one end for engaging one side of the crank arm, the other end of said pin having a series of annular grooves about the same and being of a size to fit loosely within said knob, a metal sleeve having means fastening said sleeve within said knob, a portion of said sleeve being deformable and said portion capable of receiving said pin to allow forcible insertion at the grooved end of said pin through said sleeve into said knob, whereby when the parts are forcibly assembled the pin and knob will be fixed together and can rotate in said crank arm.

2. A repair unit for attaching an operating knob having an opening to a crank arm having an opening alignable with said knob opening, a pin having a shank of a size to fit rotatably within the opening in said crank arm and to extend loosely into said knob, abutment means at one end of said pin to prevent the same from passing through the crank arm, and annular grooves at its other end for engagement with a fastener, a fastener comprising a sleeve having means fastening said sleeve within said knob, a portion of said sleeve being deformable and said portion capable of receiving said pin to grippingly engage said pin for fastening said knob in fixed relation to said pin.

References Cited in the file of this patent

UNITED STATES PATENTS

| | | |
|---|---|---|
| Re. 22,543 | Tinnerman | Sept. 5, 1944 |
| 1,911,916 | Menamin | May 30, 1933 |
| 2,290,807 | Keeler | July 21, 1942 |
| 2,345,685 | Rhein | Apr. 4, 1944 |
| 2,496,700 | Cole | Feb. 7, 1950 |
| 2,528,675 | Tinnerman | Nov. 7, 1950 |
| 2,621,947 | Markvart | Dec. 16, 1952 |